(No Model.)
J. G. & A. HARGRAVE.
PROCESS OF PURIFYING AND DEODORIZING BUTTER, &c.
No. 601,319. Patented Mar. 29, 1898.
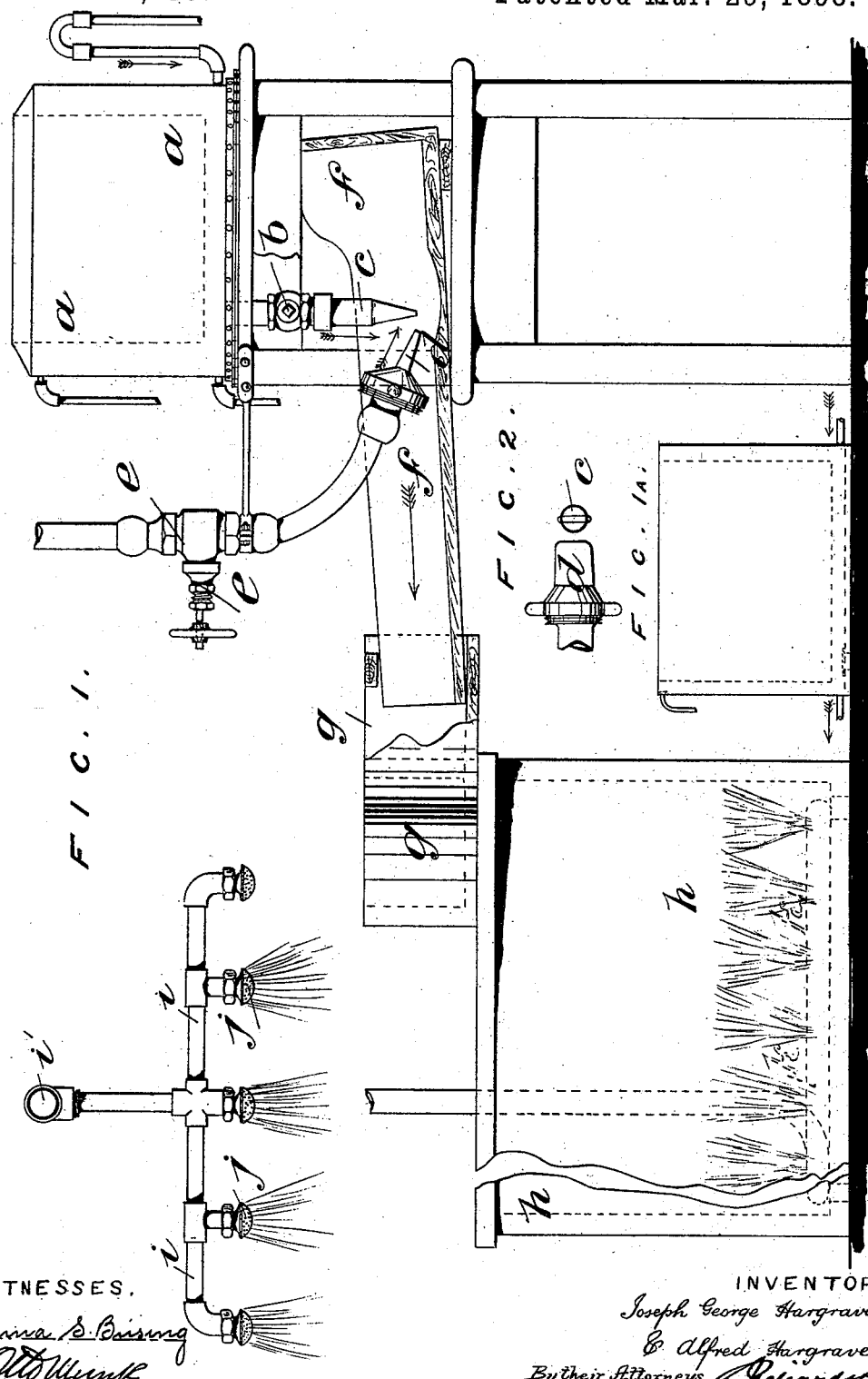
WITNESSES.
INVENTORS.
Joseph George Hargrave,
C. Alfred Hargrave,
By their Attorneys

UNITED STATES PATENT OFFICE.

JOSEPH GEORGE HARGRAVE AND ALFRED HARGRAVE, OF NEAR MANCHESTER, ENGLAND.

PROCESS OF PURIFYING AND DEODORIZING BUTTER, &c.

SPECIFICATION forming part of Letters Patent No. 601,319, dated March 29, 1898.

Application filed January 20, 1897. Serial No. 619,965. (No specimens.) Patented in England October 15, 1896, No. 22,873.

*To all whom it may concern:*

Be it known that we, JOSEPH GEORGE HARGRAVE and ALFRED HARGRAVE, subjects of the Queen of Great Britain and Ireland, and residents of near Manchester, England, have invented certain new and useful Improvements in Processes of Purifying and Deodorizing Butter and other Solid Fats and Oils, (for which we have applied for a patent in Great Britain, No. 22,873, dated October, 15, 1896,) of which the following is a specification.

Our said invention relates to certain improvements in the method of purifying, cleansing, and deodorizing butter and other solid fats and oils. The invention is, however, principally intended to be used in the treatment of butter which may, by defects in manufacture or by deterioration in storage or from other causes, have developed strong and rancid flavors or have become otherwise more or less repugnant to taste or smell. Apart from this, however, our invention may be used to improve the quality of inferior butter or fats, so as to make them command higher prices.

In treating butter, for example, according to our invention it is necessary first to disintegrate or break up the butter into small separate particles or atoms and then subject the same to the action of sprays, showers, or currents of water, so as to thoroughly cleanse, permeate, and purify the disintegrated mass of particles. The first stage—viz., that of disintegration—is effected in the following manner: The butter to be treated is melted in a suitable vessel, and when reduced to the condition of an oily fluid we run it down an inclined conduit or trough, and in the said conduit or trough we cause it to be met by a stream or streams of cold water, which may be artificially refrigerated to have the greater effect. The consequence of the sudden contact between the hot melted butter and the cold water is that the melted butter is broken up and transformed immediately into a granulated or atomized mass of separate particles, which are carried by the current of water into a vat or pan, where the granulated or disintegrated butter floats on the surface of the water. We now subject this floating mass of granulated or disintegrated butter to the second stage in our process. The most convenient method of doing so is to arrange above the vat or pan containing the floating butter a series of sprays or perforated roses through which cold water is forced or allowed to fall in a spray or shower upon the floating butter. This treatment is kept up for a number of hours, the time varying according to the quality or nature of the butter being treated. When sufficiently purified, the butter is removed from the vat and will then be found to be perfectly sweet and odorless. The purified granular mass may then be worked, churned, or otherwise suitably treated so as to restore it to a marketable condition. The method of breaking up and disintegrating the hot melted butter might also be modified to some extent; but in all cases we consider it essential that it should be brought into sudden contact with cold or refrigerated water, so as to separate the liquid fat into independent small particles.

An apparatus which we have found suitable for carrying our invention into effect is indicated in Figure 1. Fig. 1ª shows on a smaller scale a melting-vat in which we prefer to melt the butter preparatory to placing the mass in the cavity-pan. Fig. 2 shows the two nozzle-outlets in plan, the tube $c$ being in section.

In working under our process we may first of all by the application of heat reduce the butter or the like to be treated to the condition of an oily fluid in a vat or tank, such as is indicated in Fig. 1ª. Any impurities floating upon or contained in the melted mass are skimmed off or removed. The contents of this vat or tank may be allowed to cool or be at once removed to the cavity-pan $a$, where the butter or substance being treated is again subjected to the application of heat until such time as it becomes of the consistency of an oily fluid, whereupon by turning the valve $b$ the contents of the pan are allowed to pass down through the funnel or spout $c$. Upon issuing from the orifice of the spout $c$ we cause the fluid butter to be met by a jet or jets of water discharged from the nozzle $d$, the flow of water to the spraying or discharging nozzle $d$ being regulated by the stop-cock $e$. The effect of thus meeting or bringing into contact with cold water under pressure the melted butter causes thorough disintegration of the same, so that the oily mass is broken up into innumerable small particles and at once solidified by the cooling action. The numerous atoms of butter are now carried or flow down the trough-section $f$ in the swirl and eddy of the water from the nozzle $d$ via other sections $g$ into one of a series of vats or tanks $h$. In these vats we subject the disintegrated butter particles to the action of sprays, jets, or showers, or to agitation for a prolonged period, which may extend over a number of hours. In the drawings a number of pipe branches $i$, supplied from the feed-pipe $i'$ and furnished with roses $j$, are supposed to extend over the vat and to discharge water upon the floating particles or atoms of butter. We may also, as indicated in the drawings, lay a coil or coils of perforated pipes $k$ along the bottom of the vat, such pipes discharging water against the granulated butter particles from below and so reduce the time necessary to thoroughly oxygenate the atomized floating and agitated mass. When thoroughly oxygenated and purified, we remove the mass from the vat $h$, after which it may be worked up for the market.

Although we have particularly referred to butter as the material treated, our invention is also applicable to the treatment of butter substitutes, such as margarine, and to other solid fats and oils.

We claim—

The improved process of purifying butter consisting in melting it, subjecting the same while hot to the action of cold water to disintegrate the same into separate small particles, allowing said particles to float and then showering or spraying cold water down upon them, substantially as described.

In witness whereof we have hereunto set our hands in presence of two witnesses.

JOSEPH GEORGE HARGRAVE.
ALFRED HARGRAVE.

Witnesses:
JOSHUA ENTWISLE,
RICHARD IBBERSON.